Oct. 25, 1949.  W. J. FLETT  2,485,873
PROCESS OF MAKING FINISHED CIRCUMFERENTIALLY
SURFACED LENSES FROM LENS STOCK
Filed Feb. 5, 1944
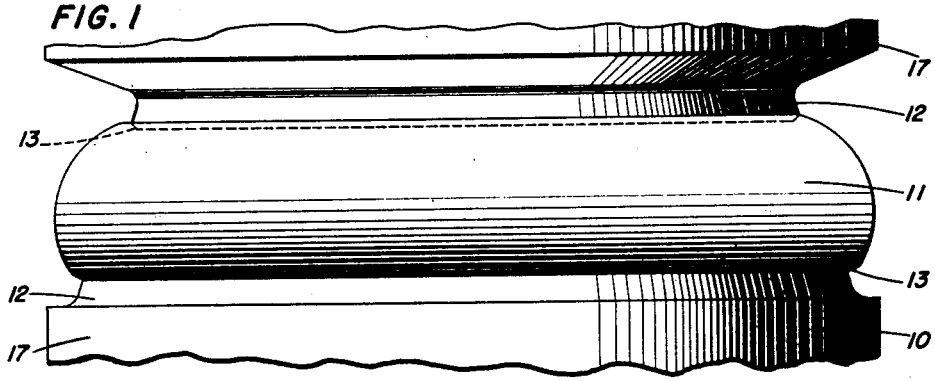
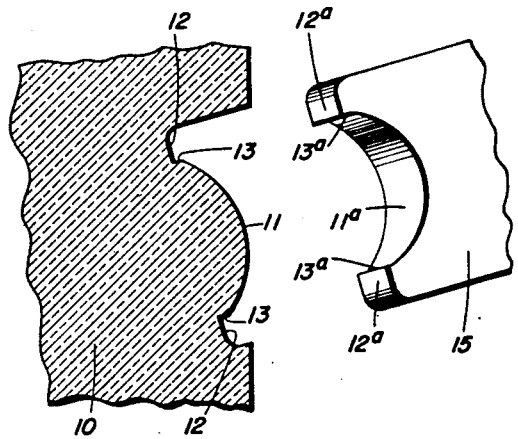
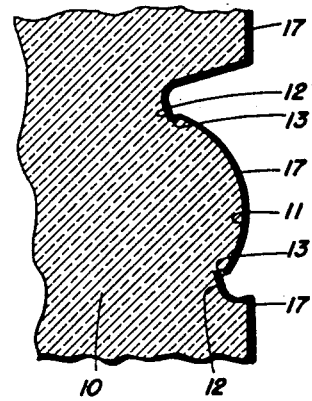
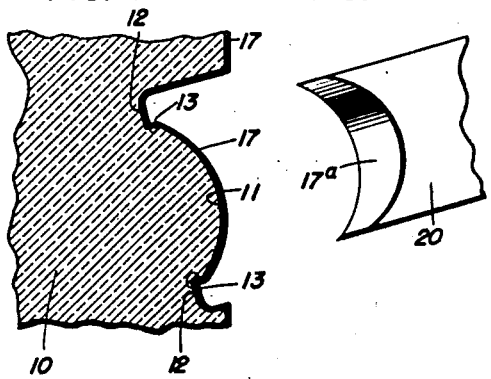
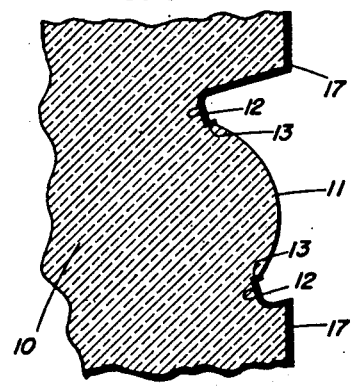
INVENTOR
WILLIAM J. FLETT
BY
ATTORNEY Patented Oct. 25, 1949

2,485,873

UNITED STATES PATENT OFFICE 2,485,873

PROCESS OF MAKING FINISHED CIRCUMFERENTIALLY SURFACED LENSES FROM LENS STOCK

William J. Flett, Washington, D. C., assignor to the United States of America as represented by the Secretary of the Navy Application February 5, 1944, Serial No. 521,277

1 Claim. (Cl. 88—57)

This invention relates to the manufacture of lenses of the type which includes a lens body having substantially opaque surfaces defining a lens face on the body. More particularly, the invention has reference to a novel process of making lenses of this type and which process may be practised expeditiously at low cost.

One object of the invention resides in the provision of a process of making a lens of the character described whereby the lens may be formed with a uniform, arcuate lens face having sharp, finished edges.

Another object of the invention is to provide a process of making a lens of the character described whereby the lens face may be formed without chipping the substantially opaque surfaces defining the lens face.

A further object of the invention resides in the provision of a process of making lenses which is characterized by its simplicity.

Still another object of the invention is to provide a tool for use in forming the lens to receive a mask for defining the lens face.

In accordance with the process of the present invention, the lens is made from a block of lens stock which is formed with a generally arcuate face and with troughs extending along the sides of the face. The arcuate face and the troughs are masked with a suitable opaque material, preferably by painting or spraying the material on the lens block, and the mask is removed from the arcuate face while retaining the mask in the troughs. Thus, the finished arcuate face forms a lens surface which is sharply defined by the mask remaining in the troughs.

For a better understanding of the invention, reference may be had to the accompanying drawing, in which Fig. 1 is a side view of a finished lens made in accordance with the invention;

Fig. 2 is a longitudinal sectional view of a block of lens stock, showing the arcuate lens face and the troughs formed in the block;

Fig. 2A is a perspective view of a tool for forming the lens face and the troughs;

Figs. 3 and 4 are views similar to Fig. 2 showing the mask applied to the lens face and the troughs;

Fig. 4A is a perspective view of a finishing tool for removing the mask from the lens face, and Fig. 5 is a longitudinal sectional view of the lens showing the lens face exposed by removal of the mask therefrom.

Referring to Fig. 2 of the drawing, the numeral 10 designates a block of lens stock of any suitable material, for example, a transparent or translucent plastic. According to the process of the present invention, the block 10 is formed with a convex lens face 11 and with troughs 12 extending along the sides of the face, the troughs being defined in part by side walls 13 extending sharply inwardly from the face 11.

The convex face 11 and the troughs 12, as shown, are formed by cutting away material from the block 10, and for this purpose it is preferred to employ the cutting tool shown in Fig. 2A. As there shown, the tool comprises a cutting head 15 having at its end a concave face 11a forming a cutting edge. The cutting head is also provided at its end with shoulders 12a disposed at the sides of the concave face 11a and having substantially straight side walls 13a projecting forwardly from the concave face. In the practice of the process, the cutting head 15 is drawn along the block 10 so that the concave cutting surface 11a forms the convex face 11 on the block, and the shoulders 12a form the troughs 12 along the sides of the face 11.

The surface of the block is then masked, as shown at 17 in Fig. 3, to cover completely the lens face 11 and the surfaces of the troughs 12. The mask 17 may be applied in any suitable manner, as, for example, by spraying or painting an opaque material over the surfaces.

After the masking material 17 has been applied, the mask covering the lens face 11 is removed, as shown in Fig. 5. In order to facilitate the removal of the mask from the lens face 11, use is made of the finishing tool shown in Fig. 4A. The finishing tool comprises a head 20 having a concave cutting edge 17a conforming to the shape of the lens face 11. In the use of the tool 20, the cutting edge 17a is placed on the mask 17 covering the lens face 11 (Fig. 4) so that the sides of the cutting edge terminate at and lie flush with the outer ends of the side walls 13 of the troughs 12. The finishing tool 20 is then drawn along the lens face 11 parallel to the troughs so as to remove the mask 17 from the lens face without disturbing the mask in the troughs. The tool 20 also removes any irregularities on the lens face 11, with the result that the finished face 11 is provided with a smooth surface.

The new process may be used for making lenses of various forms, and for illustrative purposes there is shown in Fig. 1 a toroidal lens made in accordance with the invention. As there shown, the lens comprises a hollow lens body 10 having an annular, convex lens face 11 defined by the masking material 17 in the troughs 12 extending along the sides of the lens face. A lens of this form is particularly suitable for use in converging light rays on a photo-sensitive device disposed within the lens body 10, the lens being effective through an angle of 360° around the body.

It will be evident that by the practise of the new process, the lens is provided with a smooth, finished lens face 11 having edges which are sharply defined by the mask 17 in the troughs 12. The relatively steep side walls 13 of the troughs serve as a foundation for the opaque masking 17 so that the lens face 11 may be finished without chipping the defining edges formed by the masking in the troughs. The process requires only a few simple operations which may be performed by relatively unskilled labor.

What is claimed is:

A process of making a lens from lens stock, which comprises cutting the stock to form a transparent finished circumferential convex lens surface and annular troughs along the sides of said surface, painting the convex lens surface and the troughs with an opaque coating material to form a mask thereon, and removing the mask from the transparent finished convex lens surface while retaining the mask in the troughs, whereby the mask in the troughs defines sharp finished edges on said transparent convex lens surface.

WILLIAM J. FLETT.

REFERENCES CITED

The following references are of record in the file of this patent:

UNITED STATES PATENTS

| Number | Name | Date |
| --- | --- | --- |
| 221,552 | Hanson | Nov. 11, 1879 |
| 1,085,611 | Humbrecht | Feb. 3, 1914 |
| 1,098,905 | Humbrecht | June 2, 1914 |
| 1,457,804 | Wigand | June 5, 1923 |
| 1,556,566 | Wright | Oct. 6, 1925 |
| 2,137,598 | Vos | Nov. 22, 1938 |
| 2,237,744 | Mullen | Apr. 8, 1941 |
| 2,259,902 | McCain | Oct. 21, 1941 |
| 2,314,838 | Kingston | Mar. 23, 1943 |